US012571246B2

(12) United States Patent
Krishnaiah et al.

(10) Patent No.: US 12,571,246 B2
(45) Date of Patent: Mar. 10, 2026

(54) TENSIONER FOR WINDOW REGULATOR

(71) Applicant: Inteva Products, LLC, Troy, MI (US)

(72) Inventors: Harish Krishnaiah, Bengaluru (IN); D.H. Pavan Kumar, Bengalore (IN); Patrice Cardine, Orleans (FR)

(73) Assignee: INTEVA PRODUCTS, LLC, Troy, MI (US)

(*) Notice: Subject to any disclaimer, the term of this patent is extended or adjusted under 35 U.S.C. 154(b) by 0 days.

(21) Appl. No.: 18/751,773

(22) Filed: Jun. 24, 2024

(65) Prior Publication Data

US 2024/0426157 A1 Dec. 26, 2024

(30) Foreign Application Priority Data

Jun. 23, 2023 (IN) ............................ 202311041963

(51) Int. Cl.
*E05F 15/689* (2015.01)

(52) U.S. Cl.
CPC ....... *E05F 15/6911* (2024.01); *E05Y 2900/55* (2013.01)

(58) Field of Classification Search
CPC ............... E05F 15/6911; E05F 15/6914; E05F 15/6916; E05Y 2900/55; E05Y 2201/654; E05Y 2201/662; E05Y 2201/672
USPC ........................................................... 49/352
See application file for complete search history.

(56) References Cited

U.S. PATENT DOCUMENTS

| | | | | |
|---|---|---|---|---|
| 5,257,592 A * | 11/1993 | Schaefer | B63B 21/22 114/215 |
| 7,877,932 B2 * | 2/2011 | Kriese | B60J 1/17 49/502 |
| 2009/0056476 A1 * | 3/2009 | Glass | G01L 5/103 73/862.391 |
| 2011/0049326 A1 * | 3/2011 | Fuller | H02G 11/02 248/610 |
| 2018/0094468 A1 * | 4/2018 | Stewart | E05D 15/165 |
| 2024/0426157 A1 * | 12/2024 | Krishnaiah | E05F 15/6911 |

FOREIGN PATENT DOCUMENTS

| | | | |
|---|---|---|---|
| CN | 2895878 Y | 5/2007 | |
| CN | 108035647 A * | 5/2018 | E05F 15/697 |
| CN | 110528996 A * | 12/2019 | E05F 15/689 |
| DE | 19852977 C1 * | 10/1999 | E05F 11/485 |
| DE | 202016005232 U1 * | 12/2017 | E05F 11/485 |
| DE | 202024103415 U1 * | 9/2024 | E05F 15/689 |
| DE | 202025100428 U1 * | 3/2025 | E05F 15/6909 |
| EP | 1491780 A2 * | 12/2004 | E05F 11/485 |
| EP | 1498565 A2 * | 1/2005 | E05F 11/485 |

(Continued)

OTHER PUBLICATIONS

German Office Action corresponding to DE Application No. 20 2024 103 415.5; Issue Date, Aug. 9, 2024.

(Continued)

*Primary Examiner* — Daniel P Cahn
(74) *Attorney, Agent, or Firm* — CANTOR COLBURN LLP

(57) ABSTRACT

A short drop tensioner for a window regulator for raising and lowering a window of a vehicle, including only three parts: a tensioner support; a tensioner sleeve; and a spring disposed between the tensioner support and the tensioner sleeve.

17 Claims, 5 Drawing Sheets

(56) References Cited

FOREIGN PATENT DOCUMENTS

| | | | | | |
|---|---|---|---|---|---|
| FR | 2864184 | A1 | * | 6/2005 | ............ E05F 11/485 |
| KR | 20220009211 | A | * | 1/2022 | |
| KR | 20240123510 | A | * | 8/2024 | |
| WO | WO-9734067 | A1 | * | 9/1997 | ............ E05F 11/485 |

OTHER PUBLICATIONS

CNIPA Notification of First Office Action corresponding to CN Application No. 202421451956.9; Issue date: Jan. 6, 2025, 5 pages.

CNIPA Notification of the Second Office Action corresponding to CN Application No. 202421451956.9; Issue Date, Apr. 1, 2025, 4 pages.

* cited by examiner

Double Lift Frameless Window Regulator

Single Lift Frameless Window Regulator

Short Drop Tensioner

Short Drop Tensioner

TENSIONER FOR WINDOW REGULATOR

CROSS REFERENCE TO RELATED APPLICATIONS

This application claims priority under 35 U.S.C. § 119 to the following Indian Provisional Patent Application No. 202311041963 filed on Jun. 23, 2023, the entire contents of which are incorporated herein by reference thereto.

TECHNICAL FIELD

Exemplary embodiments pertain to the art of vehicles, and more particularly to tensioners for vehicle window regulators.

BACKGROUND

Passenger vehicles typically have windows surrounding the passenger compartment. Windows in doors of the vehicle may be designed to be raised and lowered electrically by an operator. The operator may be the driver or a passenger usually using an interior switch. The physical raising and lowering of a window are performed by an electromechanical device referred to as a window regulator.

The window regulator includes a drive unit (motor) connected to a drive device (such as cable or belt) that transmits a drive force to the window regulator. The window may be driven by slides or cursors that are moveable along tracks or guide rails under the action of the cable. The cable may be split into a lower cable and an upper cable wound in opposite directions on a drum driven by the motor.

The tension in the cable or cables in the window regulator must be effectively controlled. Slack in the cable or cables leads to inaccuracy in the operation of the window regulator and inaccuracy in the position of the slides or cursors relative to the position of the drum winding the cable. On the other hand, over tension in the cable can cause low efficiency and prematurely wear the window regulator components.

The operating accuracy of the window regulator is important, especially for a window regulator utilized in a frameless door. In a frameless car door, the glass top edge is engaged with the roof seal when it is fully closed. When the door is opened by the handle/switch, the glass will drop to a position that is lower than the roof seal. This dropping action of the glass when the door is opened is called a 'short drop'.

This function is subject to regulations and customer (users) expectations. One of these expectations is to open door after short drop during window regulator lifetime. For this function, the motor will turn for a constant value, and the expectation is to have an almost constant value for the cursor movement. However, due to cable loop slackness, which can vary depending on aging and load conditions, the cursor movement may fluctuate. Therefore, most frameless window regulators with a short drop feature are equipped with an irreversible tensioner on the lower cable. This tensioner helps maintain a constant ratio between the motor and cursor during the short drop function. The glass must therefore be moved accurately so that the opening of the door is not hindered. The movement must also not be too great to meet regulatory constraints to meet short drop and in anti-pinch regulations. There must therefore be sufficient tension in the window drive cable to ensure accurate movement of the window.

The components of the window regulator device are subject to gradual aging, which can lead to elongation of the cable due to, for example, wear on the driving drum and the pulleys, the compression of the cable sheaths, or creep in the pulleys. Cable elongation due to aging of the various parts of the window regulator must be compensated for.

Moreover, when the window is being raised, the drive motor still applies torque to the window regulator device when the window reaches its upper limit. The over torque at the upper limit can cause elastic deformation of the window regulator components and cause elastic elongation of the cable and the other stressed units.

Play compensation mechanisms are employed to absorb the elongation of the cable and ensure sufficient tension for the correct operation of the window regulator device. However, these mechanisms comprise multiple components.

The aforementioned irreversible tensioner devices are quite complicated and expensive.

Thus, there is a need for a cable tensioner in a window regulator device that is formed from a minimal number of components.

BRIEF DESCRIPTION

Disclosed is a short drop tensioner for a window regulator for raising and lowering a window of a vehicle, including only three parts: a tensioner support; a tensioner sleeve; and a spring disposed between the tensioner support and the tensioner sleeve.

In addition to one or more of the features described above, or as an alternative to any of the foregoing embodiments, the tensioner sleeve is slidably mounted to the tensioner support and the spring provides a biasing force between the tensioner support and the tensioner sleeve.

In addition to one or more of the features described above, or as an alternative to any of the foregoing embodiments, the tensioner sleeve has a head portion, a stud portion and a flange portion disposed between the head portion and the stud portion.

In addition to one or more of the features described above, or as an alternative to any of the foregoing embodiments, the flange portion has a larger periphery than the head portion and the stud portion such that a pair of opposing surfaces are provided, one of the pair of opposing surfaces provides an engagement surface for a cable sheath and the head portion is configured to be received with the cable sheath and the other one of the pair of opposing surfaces provides an engagement surface for a first end of the spring.

In addition to one or more of the features described above, or as an alternative to any of the foregoing embodiments, the tensioner support has a securement portion, a guide portion, and a flange portion disposed between the securement portion and the guide portion, the flange portion of the tensioner support has a larger periphery than the guide portion and at least a portion of the securement portion such that a pair of opposing surfaces, one of the pair of opposing surfaces of the flange portion of the tensioner support provides an engagement surface for a second end of the spring.

In addition to one or more of the features described above, or as an alternative to any of the foregoing embodiments, the spring is configured to be slidably received about the guide portion and the stud portion and provide a biasing force to the cable sheath.

In addition to one or more of the features described above, or as an alternative to any of the foregoing embodiments, the tensioner sleeve has an inner opening passing therethrough and the tensioner support has an inner opening configured to slidably receive stud portion.

In addition to one or more of the features described above, or as an alternative to any of the foregoing embodiments, the tensioner support has another inner opening extending from inner opening of the tensioner support, another inner opening has a smaller diameter than the of the tensioner support.

Also disclosed is a window regulator, including: a first guide rail: a first cursor slidably mounted to the first guide rail: a second guide rail spaced from the first guide rail: a second cursor slidably mounted to the second guide rail: a guide rail with slidable cursor: a housing: a motor mounted to the housing and operably coupled to the cursor such that operation of the motor will cause the cursor to slide along the guide rail: a cable drum rotationally mounted to the housing: the cable drum being operably coupled to the motor: a first cable secured to the cable drum at one end and the cursor at another end: a second cable secured to the cable drum at one end and the cursor at another end: a third cable secured to the first cursor at one end and the second cursor at another end: a first cable sheath surrounding the first cable, a first end of the first cable sheath extends from a first feature of the guide rail: a short drop tensioner located between the housing and a second end of the first cable sheath, the cable tensioner comprising only three parts: a tensioner support, a tensioner sleeve, and a spring disposed between the tensioner support and the tensioner sleeve: a second cable sheath surrounding the second cable that extends from the housing to a second feature of the guide rail; and a third cable sheath surrounding the third cable that extends from a second feature of the first guide rail to a first feature of the second guide rail, wherein the window regulator is configured for raising and lowering a window of a frameless door assembly of a vehicle.

In addition to one or more of the features described above, or as an alternative to any of the foregoing embodiments, the tensioner sleeve is slidably mounted to the tensioner support and the spring provides a biasing force between the tensioner support and the tensioner sleeve.

In addition to one or more of the features described above, or as an alternative to any of the foregoing embodiments, the tensioner sleeve has a head portion, a stud portion and a flange portion disposed between the head portion and the stud portion.

In addition to one or more of the features described above, or as an alternative to any of the foregoing embodiments, the flange portion has a larger periphery than the head portion and the stud portion such that a pair of opposing surfaces are provided, one of the pair of opposing surfaces provides an engagement surface for a cable sheath and the head portion is configured to be received with the cable sheath and the other one of the pair of opposing surfaces provides an engagement surface for a first end of the spring.

In addition to one or more of the features described above, or as an alternative to any of the foregoing embodiments, the tensioner support has a securement portion, a guide portion, and a flange portion disposed between the securement portion and the guide portion, the flange portion of the tensioner support has a larger periphery than the guide portion and at least a portion of the securement portion such that a pair of opposing surfaces, one of the pair of opposing surfaces of the flange portion of the tensioner support provides an engagement surface for a second end of the spring.

In addition to one or more of the features described above, or as an alternative to any of the foregoing embodiments, the spring is configured to be slidably received about the guide portion and the stud portion and provide a biasing force to the cable sheath.

In addition to one or more of the features described above, or as an alternative to any of the foregoing embodiments, the tensioner sleeve has an inner opening passing therethrough and the tensioner support has an inner opening configured to slidably receive stud portion.

In addition to one or more of the features described above, or as an alternative to any of the foregoing embodiments, the tensioner support has another inner opening extending from inner opening of the tensioner support, another inner opening has a smaller diameter than the of the tensioner support.

Also disclosed is a method of taking up slack in a first cable of a window regulator, including: slidably mounting a cursor to a guide rail: a motor mounted to the housing and operably coupled to the cursor such that operation of the motor will cause the cursor to slide along the guide rail: rotatably mounting a cable drum to the housing, the cable drum being operably coupled to the motor: securing a first cable to the cable drum at one end and the cursor at another end: securing a second cable to the cable drum at one end and the cursor at another end: securing a third cable to the first cursor at one end and the second cursor at another end: surrounding the first cable with a first cable sheath, a first end of the first cable sheath extends from a first feature of the guide rail: locating a cable tensioner between the housing and a second end of the first cable sheath, the cable tensioner comprising of only three parts: a tensioner support, a tensioner sleeve, and a spring disposed between the tensioner support and the tensioner sleeve: surrounding the second cable with a second cable sheath, the second cable sheath extending from the housing to a second feature of the guide rail; and surrounding the third cable with a third cable sheath, the third cable sheath extending from a second feature of the first guide rail to a first feature of the second guide rail, wherein the window regulator is configured for raising and lowering a window of a frameless door assembly of a vehicle.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Disclosed herein is an apparatus for raising and lowering a window of a vehicle. The apparatus may be referred to as a "window regulator". In one or more embodiments, the window regulator is an electromechanical device that can be controlled by a user inside the vehicle such as by operating a switch.

Figure 1:
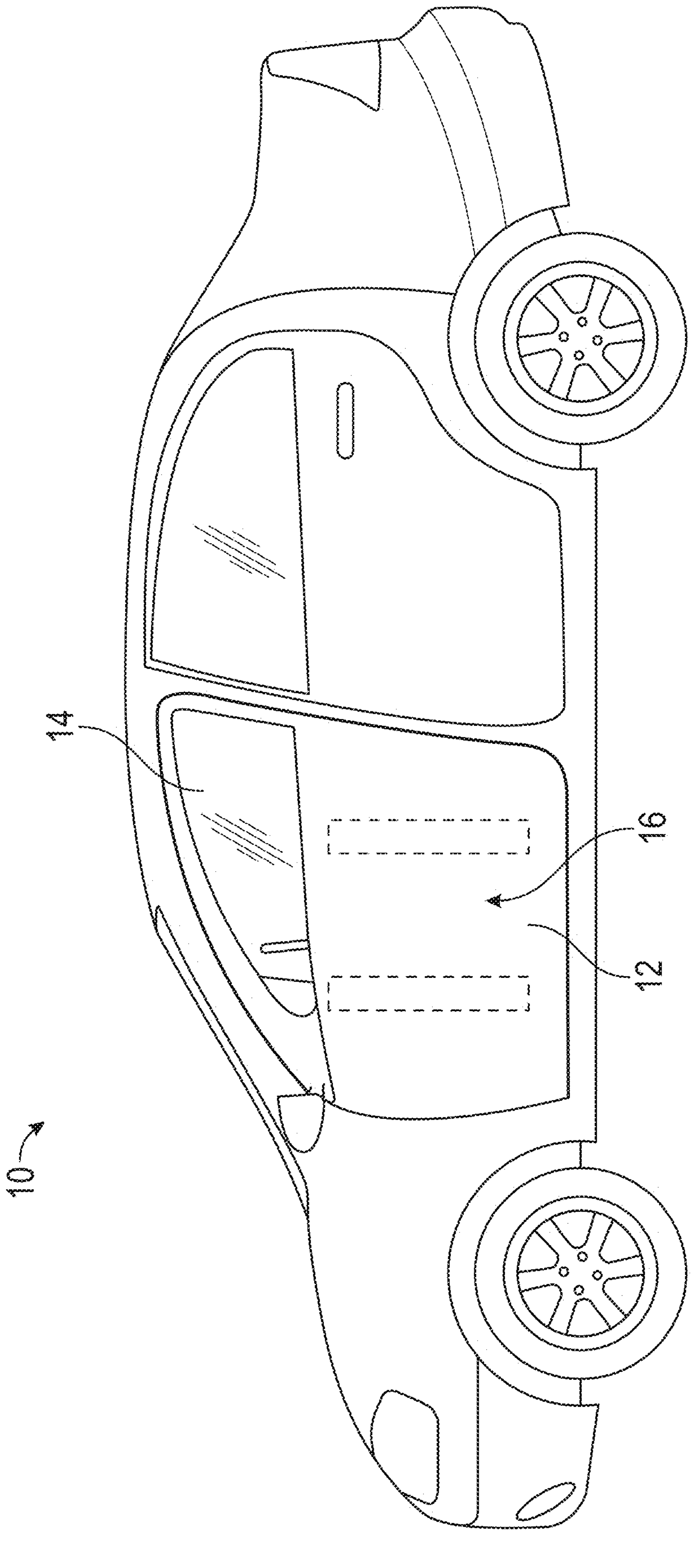
FIG. 1 is a partial view of a vehicle having a window regulator with a tensioner according to the present disclosure.

FIG. 1 is a partial side view of a vehicle 10 having at least one door 12 with a window 14 that is configured to be raised and lowered by a window regulator 16 disposed within door panels (e.g., exterior and interior) of the door 12. Although only one door 12 and window 14 is illustrated it is contemplated that the window regulator or the present disclosure can be used in a vehicle having numerous doors and associated windows. As such, one or more other windows 14 of the vehicle 10 may also be operated by a window regulator 16 according to the present disclosure. In one embodiment, the window regulator 16 is configured for raising and lowering a window with a frameless vehicle door.

Figure 2A:
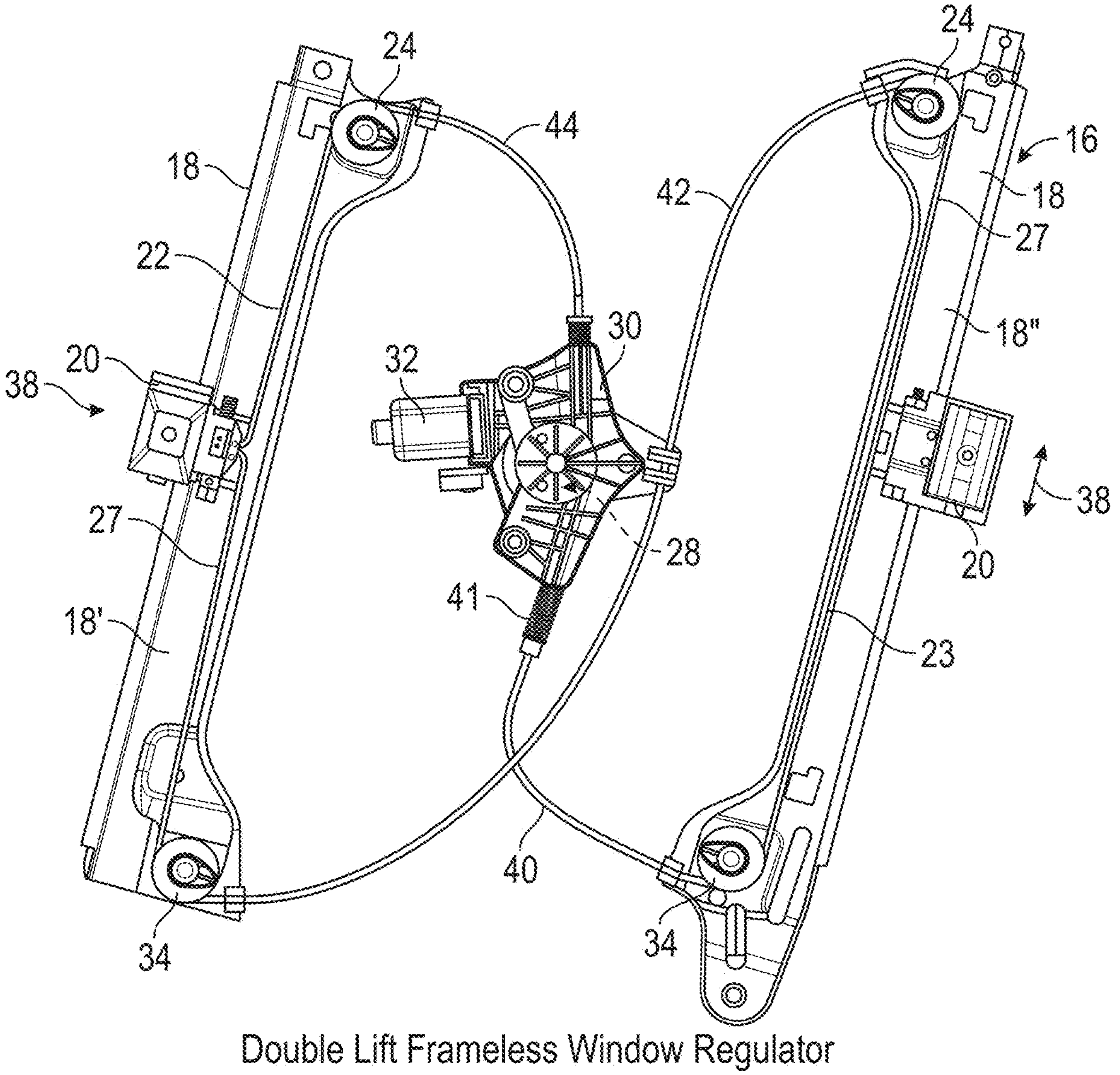
FIG. 2A is a perspective view of a double lift window regulator with a tensioner according to the present disclosure.

FIG. 2A is a perspective view of the double lift window regulator 16. The window regulator 16 includes a pair of guide rails 18 each having a cursor 20 that is slidably secured to a respective guide rail 18 of the pair of guide rails 18. The pair of guide rails 18 may be referred to as a first guide rail 18' and a second guide rail 18". In the illustrated embodiment, the first guide rail 18' is located closer a forward portion of the vehicle or vehicle door than the second guide rail 18" when the window regulator 16 is secured to the vehicle door. As such, the second guide rail 18" is located closer a rear portion of the vehicle or vehicle door than the first guide rail 18' when the window regulator 16 is secured to the vehicle door. In addition, the corresponding cursor may be referred to as a first cursor 20 and a second cursor 20. Each cursor 20 is configured to be secured to the window 14 and each cursor 20 is operably coupled to a pair of cables.

Each one of the pair of guide rails 18 of the window regulator 16 may have an upper pulley or upper cam 24 that is secured to a top portion of each guide rail 18. As illustrated, the upper pulley or upper cam 24 is aligned with the guide rail 18. The upper pulley or upper cam is configured to receive either rotationally or slidably a cable. For example, a first cable 22 is secured to one of the pair of cursors 20 at one end and a cable drum 28 at an opposite end and a second cable 23 is secured to the other one of the pair of cursors 20 at one end and the cable drum 28 at an opposite end. In addition, a third cable 27 is secured to one of the pair of cursors 20 at one end and the other one of the pair of cursors 20 at an opposite end.

Figure 2B:
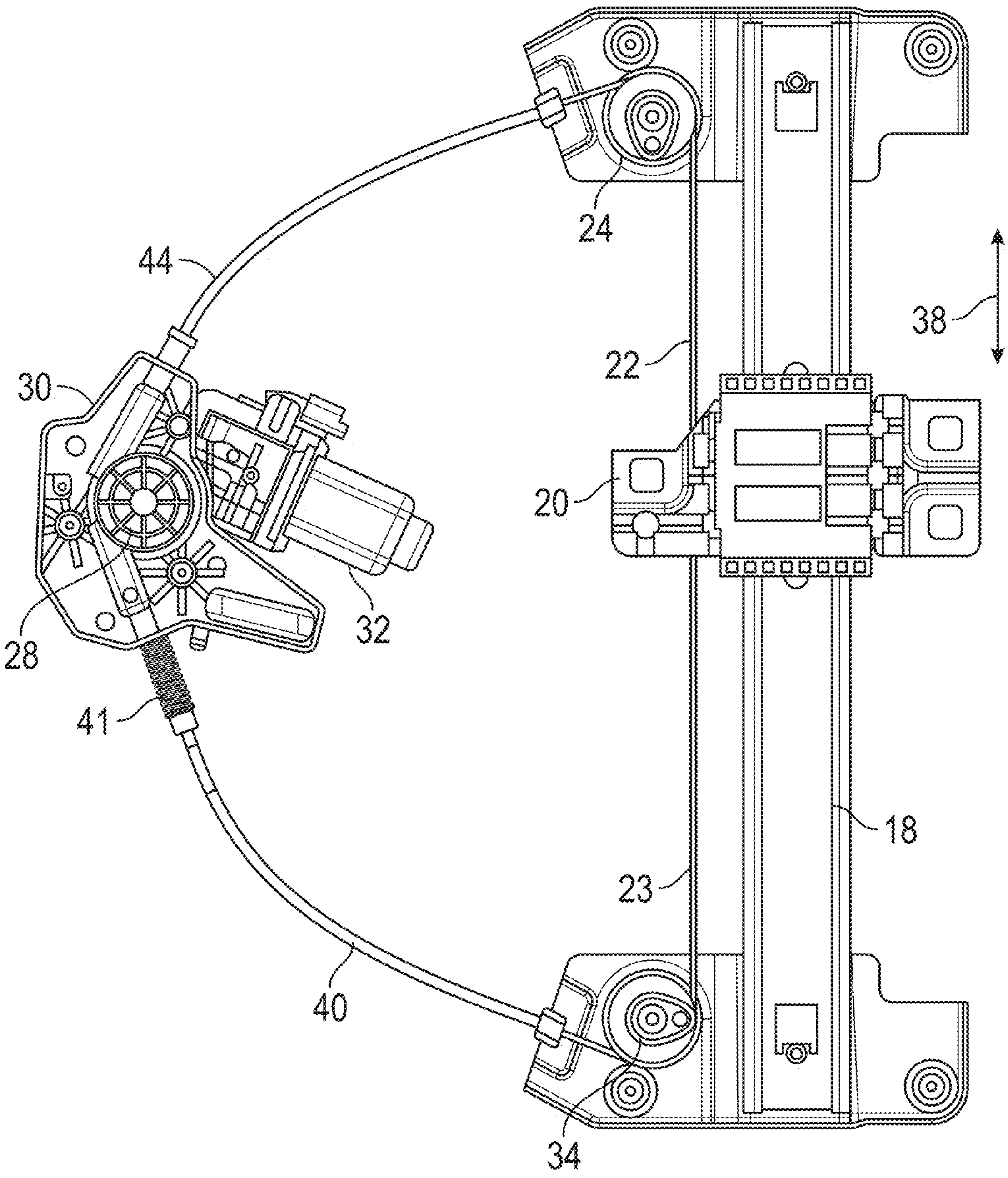
FIG. 2B is a perspective view of a single lift window regulator with a tensioner according to the present disclosure.

FIG. 2B is a perspective view of the single lift window regulator 16. The single lift window regulator includes a guide rail 18 having a cursor 20 that is slidably secured to it. Cursor 20 is configured to be secured to the window 14 and is operably coupled to a pair of cables.

Guide rail 18 of the window regulator 16 may have an upper pulley or upper cam 24 that is secured. The upper pulley or upper cam is configured to receive either rotationally or slidably a cable. For example, a first cable 22 is secured to cursor 20 at one end and a cable drum 28 at an opposite end and a second cable 23 is secured to the cursor 20 at one end and the cable drum 28 at an opposite end.

The cable drum 28 is rotationally mounted to a housing 30. To provide rotational movement to the cable drum 28, a motor 32 is operably coupled to the cable drum 28 by for example a worm drive (not shown) that is rotated by the motor 32. In one embodiment, the housing 30 is not secured either guide rail 18 such that it is free floating with respect to the guide rails 18.

The guide rail 18 also have a lower pulley or lower cam 34. As illustrated, the lower pulley or lower cam 34 is aligned with the guide rail 18. The lower pulley or lower cam 34 is configured to rotationally or slidably receive one of the cables.

As mentioned above, a first cable 22 is secured to one of the pair of cursors 20 at one end and a cable drum 28 at an opposite end and a second cable 23 is secured to the other one of the pair of cursors 20 at one end and the cable drum 28 at an opposite end. In addition, a third cable 27 is secured to one of the pair of cursors 20 at one end and the other one of the pair of cursors 20 at an opposite end.

As the cable drum 28 is rotated either the first cable 22 or second cable 23 will wind up on the cable drum 28 while the other unwinds thus causing movement of the cursor 20 in the directions of arrows 38. In addition, cable 27 which is not connected to the cable drum 28 will move accordingly. For example, the cable 27 is attached to a top portion of one cursor 20 at one end and a bottom portion of the other cursor 20 at its opposite end. Movement of the cursors 20 in the directions of arrows 38 will cause the window 14 to move up and down with respect to the vehicle door 12.

The window regulator 16 also includes a first cable sheath 44 for the first cable 22 that extends guide rail 18 to the housing 30. In addition, a second cable sheath 40 extends from the housing 30 guide rail 18. Still further, a third cable sheath 42 extends from a rear guide rail 18" and forward guide rail 18'.

The first cable 22 is slidably received within the first cable sheath 44, and the second cable 23 is slidably received in the second cable sheath 40, and the third cable 27 is slidably received in the third cable sheath 42. These cables 22, 23 and 27 and their associated cable sheaths 44, 40, and 42 are referred to as Bowden cables. The second cable sheath 40 also includes a short drop tensioner 41 such that slack in the second cable 23 is absorbed as is known in the related arts. For example and when the tension force given to lower cable or second cable 23 is higher than the load applied on the window regulator when moving the glass in lower direction (e.g. load applied on the window regulator in down direction=glass friction-glass load). As such, the short drop tensioner 41 of the present disclosure complies with the requirement in all condition (climatic conditions) and for all window regulator life.

Not shown are a controller for controlling the motor 32 and inputs to the controller such as user operated switches, door ajar switch and a vehicle control module that may also provide input to the controller. Also not shown is an electric power supply system, which may include a battery and alternator as vehicle electric power supply systems and window controllers are well known in the art, these components are not discussed in further detail.

Figure 3:
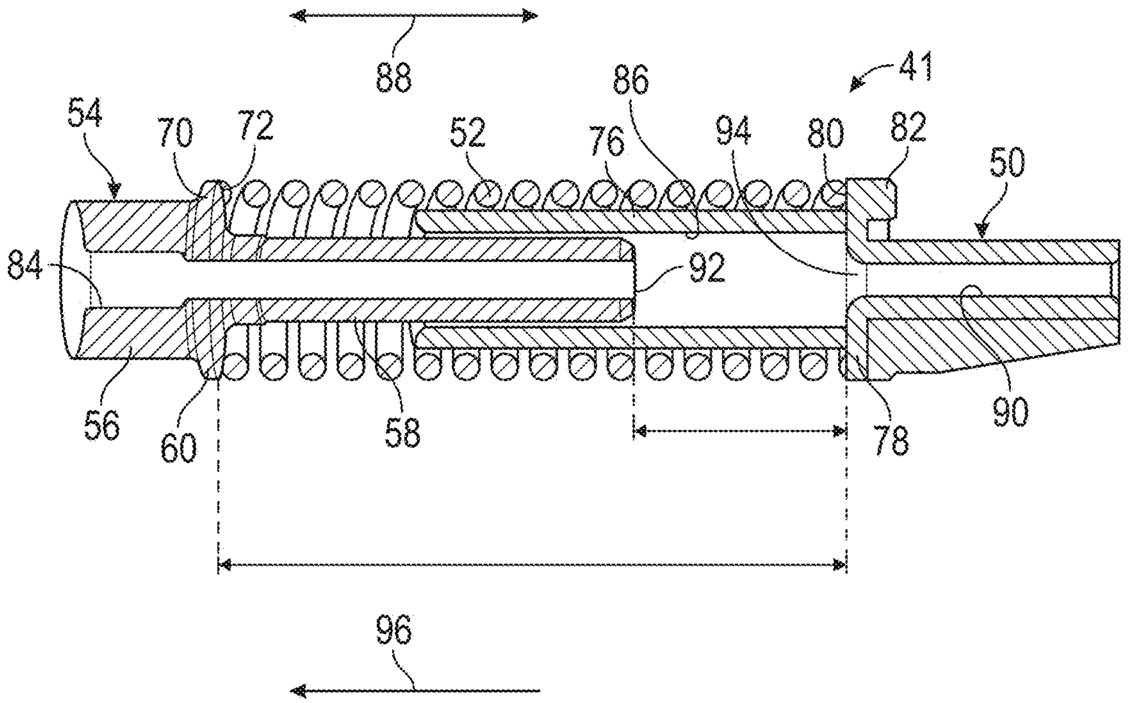
FIG. 3 is a cross sectional view of a tensioner for use with a window regulator according to the present disclosure.
Figure 4:
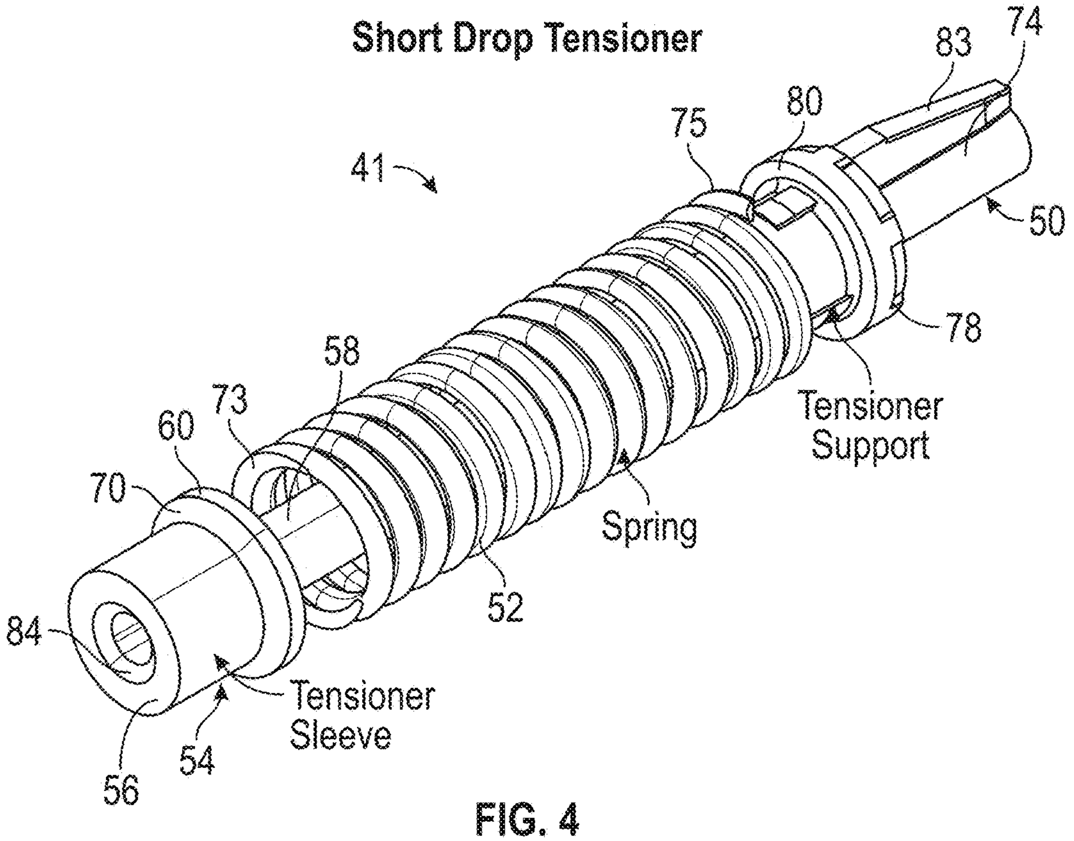
FIG. 4 is an exploded view of a tensioner for use with a window regulator according to the present disclosure.
Figure 5:
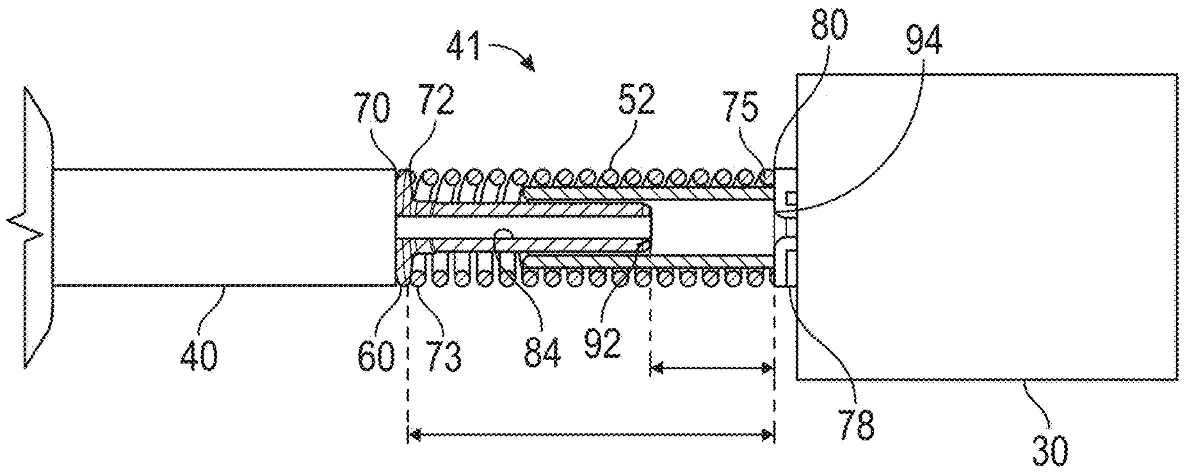
FIG. 5 illustrates a tensioner in cross sectional view located between a housing and a cable sheath of a window regulator according to the present disclosure.

Referring now to FIGS. 3-5, the short drop tensioner 41 in accordance with the present disclosure is illustrated. The short drop tensioner 41 of the present disclosure is only formed from three components a tensioner support 50, a spring 52 and a tensioner sleeve 54. The tensioner sleeve 54 is slidably mounted to the tensioner support 50 and the spring 52 provides a biasing force between the tensioner support 50 and the tensioner sleeve 54.

The tensioner sleeve 54 has a head portion 56, a stud portion 58 and a flange portion 60 disposed between the head portion 56 and the stud portion 58. In one non-limiting embodiment, the tensioner sleeve 54 is formed of a single component such that the head portion 56, the stud portion 58 and the flange portion 60 are all formed as a single component. In one non-limiting embodiment, the tensioner sleeve 54 is formed from an easily moldable material such as plastic.

The flange portion 60 has a larger periphery or diameter than the head portion 56 and the stud portion 58 such that a pair of opposing surfaces 70 and 72 are provided. Surface 70 provides an engagement surface for the first cable sheath 40 and head portion 56 is configured to be received with the first cable sheath 40. Surface portion 72 provides an engagement surface for a first end 73 of the spring 52.

The tensioner support 50 has a securement portion 74, a guide portion 76, and a flange portion 78 disposed between the securement portion 74 and the guide portion 76. In one non-limiting embodiment, tensioner support 50 is formed of a single component such that the securement portion 74, the guide portion 76, and the flange portion 78 are all formed as a single component. In one non-limiting embodiment, the tensioner support 50 is formed from an easily moldable material such as plastic.

The flange portion 78 has a larger periphery or diameter than the guide portion 76 and at least a portion of the securement portion 74 such that a pair of opposing surfaces 80 and 82 are provided. Surface 80 provides an engagement surface for a second end 75 of spring 52, the second end 75 being opposite to the first end 73 of the spring 52. The tensioner support 50 may also have a feature 83. Feature 83 may be configured to engage a complementary recess of housing 30. Feature 83 may also be integrally formed with tensioner support 50 such that it is with the single structure of tensioner support 50.

Spring 52 is configured to be slidably received or positioned about the guide portion 76 and the stud portion 58 and engage surfaces 72 and 80 to provide the required biasing force to the first cable sheath 40. The tensioner sleeve 54 has an inner opening 84 passing therethrough. The tensioner support 78 has an inner opening 86 configured to slidably receive stud portion 58. This will allow tensioner sleeve 54 to slide in the direction of arrows 88 with respect to tensioner support 50.

The tensioner support 78 has another inner opening 90 extending from inner opening 86. Another inner opening 90 has a smaller diameter or periphery than inner opening 86. Inner openings 84, 86 and 90 also provide a path for the first cable 22 to slide therethrough for example, during operation of the window regulator 16.

During operation of the window regulator 16 and as previous mentioned, slack in the first cable 22 may occur. As mentioned above, it is desirable to account for this slack with short drop tensioner 41.

Referring now to at least FIG. 3, the short drop tensioner 41 is configured to take up about 10 to 15 mm slackness in cable 22. As illustrated, a distal end 92 of the stud portion 58 tensioner sleeve 54 is approximately 10 to 15 mm from a bottom 94 of opening 86. This may be referred to the amount of slack the short drop tensioner 41 has accommodated for if the distal end 92 was located adjacent to the bottom 94 when no slack was in the first cable 22. In other words, and as slack occurs in the first cable 22, spring 52 provides a biasing force in the direction of arrow 96.

As mentioned herein, the short drop tensioner 41 consists of only three parts, the tensioner support 50, the spring 52 and the tensioner sleeve 54 and no other parts. The spring 52 is designed to have enough deflection/stiffness to manage cable slackness anticipated in the window regulator lifetime usage. The spring 52 is designed to resist the force coming from tensioner sleeve 54 during glass 14 moving down and pull the glass 14 in short time.

Elements of the embodiments have been introduced with either the articles "a" or "an." The articles are intended to mean that there are one or more of the elements. The terms "including" and "having", and the like are intended to be inclusive such that there may be additional elements other than the elements listed. The conjunction "or" when used with a list of at least two terms is intended to mean any term or combination of terms. The term "configured" relates to one or more structural limitations of a device that are required for the device to perform the function or operation for which the device is configured.

The disclosure illustratively disclosed herein may be practiced in the absence of any element which is not specifically disclosed herein.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure is not limited to the particular embodiment disclosed as the best mode contemplated for carrying out this present disclosure, but that the present disclosure will include all embodiments falling within the scope of the claims.

What is claimed is:

1. A short drop tensioner for a window regulator for raising and lowering a window of a vehicle, consisting only of three parts:

a tensioner support;

a tensioner sleeve; and a spring disposed between the tensioner support and the tensioner sleeve;

each of the three parts, respectively, forms a single monolithic construction.

2. The short drop tensioner as in claim 1, wherein the tensioner sleeve is slidably mounted to the tensioner support and the spring provides a biasing force between the tensioner support and the tensioner sleeve.

3. The short drop tensioner as in claim 2, wherein the tensioner sleeve has a head portion, a stud portion and a flange portion disposed between the head portion and the stud portion.

4. The short drop tensioner as in claim 3, wherein the flange portion has a larger periphery than the head portion and the stud portion such that the flange portion extends outwardly from the head portion and the stud portion such that a pair of opposing surfaces are provided on the flange portion that extends outwardly from the head portion and the stud portion, one of the pair of opposing surfaces provides an engagement surface for a cable sheath and the head portion is configured to be received with the cable sheath and the other one of the pair of opposing surfaces provides an engagement surface for a first end of the spring.

5. The short drop tensioner as in claim 4, wherein the tensioner support has a securement portion, a guide portion, and a flange portion disposed between the securement portion and the guide portion, the flange portion of the tensioner support has a larger periphery than the guide portion and at least a portion of the securement portion such that a pair of opposing surfaces, one of the pair of opposing surfaces of the flange portion of the tensioner support provides an engagement surface for a second end of the spring.

6. The short drop tensioner as in claim 5, wherein the spring is configured to be slidably received about the guide portion and the stud portion and the spring provides a biasing force to the cable sheath.

7. The short drop tensioner as in claim 6, wherein the tensioner sleeve has an inner opening passing therethrough and the tensioner support has an inner opening configured to slidably receive the stud portion.

8. The short drop tensioner as in claim 7, wherein the tensioner support has another inner opening extending from the inner opening of the tensioner support, the another inner opening has a smaller diameter than the inner opening of the tensioner support.

9. A window regulator, comprising:

a first guide rail;

a first cursor slidably mounted to the first guide rail;

a second guide rail spaced from the first guide rail;

a second cursor slidably mounted to the second guide rail;

a housing;

a motor mounted to the housing and operably coupled to the cursor such that operation of the motor will cause the first cursor to slide along the first guide rail and the second cursor to slide along the second guide rail;

a cable drum rotationally mounted to the housing; the cable drum being operably coupled to the motor;

a first cable secured to the cable drum at one end and the first cursor at another end;

a second cable secured to the cable drum at one end and the second cursor at another end;

a third cable secured to the first cursor at one end and the second cursor at another end;

a first cable sheath surrounding the first cable, a first end of the first cable sheath extends from a first feature of the first guide rail;

a short drop tensioner located between the housing and a second end of the second cable sheath, the short drop tensioner consisting only of three parts: a tensioner support, a tensioner sleeve, and a spring disposed between the tensioner support and the tensioner sleeve;

a second cable sheath surrounding the second cable that extends from the housing to a second feature of the second guide rail; and a third cable sheath surrounding the third cable that extends from a second feature of the first guide rail to a first feature of the second guide rail, wherein the window regulator is configured for raising and lowering a window of a frameless door assembly of a sleeve;

each of the three parts, respectively, forms a single monolithic construction.

10. The window regulator as in claim 9, wherein the tensioner sleeve is slidably mounted to the tensioner support and the spring provides a biasing force between the tensioner support and the tensioner sleeve.

11. The window regulator as in claim 10, wherein the tensioner sleeve has a head portion, a stud portion and a flange portion disposed between the head portion and the stud portion.

12. The window regulator as in claim 11, wherein the flange portion has a larger periphery than the head portion and the stud portion such that a pair of opposing surfaces are provided, one of the pair of opposing surfaces provides an engagement surface for a cable sheath and the head portion is configured to be received with the cable sheath and the other one of the pair of opposing surfaces provides an engagement surface for a first end of the spring.

13. The window regulator as in claim 12, wherein the tensioner support has a securement portion, a guide portion, and a flange portion disposed between the securement portion and the guide portion, the flange portion of the tensioner support has a larger periphery than the guide portion and at least a portion of the securement portion such that the flange portion extends outwardly from the head portion and the stud portion such that a pair of opposing surfaces are provided on the flange portion that extends outwardly from the head portion and the stud portion, one of the pair of opposing surfaces of the flange portion of the tensioner support provides an engagement surface for a second end of the spring.

14. The window regulator as in claim 13, wherein the spring is configured to be slidably received about the guide portion and the stud portion and the spring provides a biasing force to the cable sheath.

15. The window regulator as in claim 14, wherein the tensioner sleeve has an inner opening passing therethrough and the tensioner support has an inner opening configured to slidably receive the stud portion.

16. The window regulator as in claim 15, wherein the tensioner support has another inner opening extending from the inner opening of the tensioner support, the another inner opening has a smaller diameter than the inner opening of the tensioner support.

17. A method of taking up slack in a first cable of a window regulator, comprising:

slidably mounting a cursor to a guide rail;

a motor mounted to a housing and operably coupled to the cursor such that operation of the motor will cause the cursor to slide along the guide rail;

rotatably mounting a cable drum to the housing, the cable drum being operably coupled to the motor;

securing a first cable to the cable drum at one end and the cursor at another end;

securing a second cable to the cable drum at one end and the cursor at another end;

surrounding the first cable with a first cable sheath, a first end of the first cable sheath extends from a first feature of the guide rail;

surrounding the second cable with a second cable sheath, the second cable sheath extending from the housing to a second feature of the guide rail;

locating a cable tensioner between the housing and a second end of the second cable sheath, the cable tensioner consisting only of three parts: a tensioner support, a tensioner sleeve, and a spring disposed between the tensioner support and the tensioner sleeve; and wherein the window regulator is configured for raising and lowering a window of a frameless door assembly of a sleeve;

each of the three parts, respectively, forms a single monolithic construction.

* * * * *